March 6, 1934.  R. M. ROBERTSON  1,949,920
HOIST
Filed March 26, 1931   3 Sheets-Sheet 1
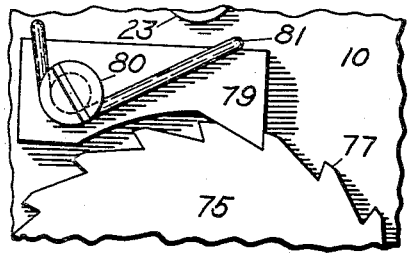
Fig. 2
Fig. 1
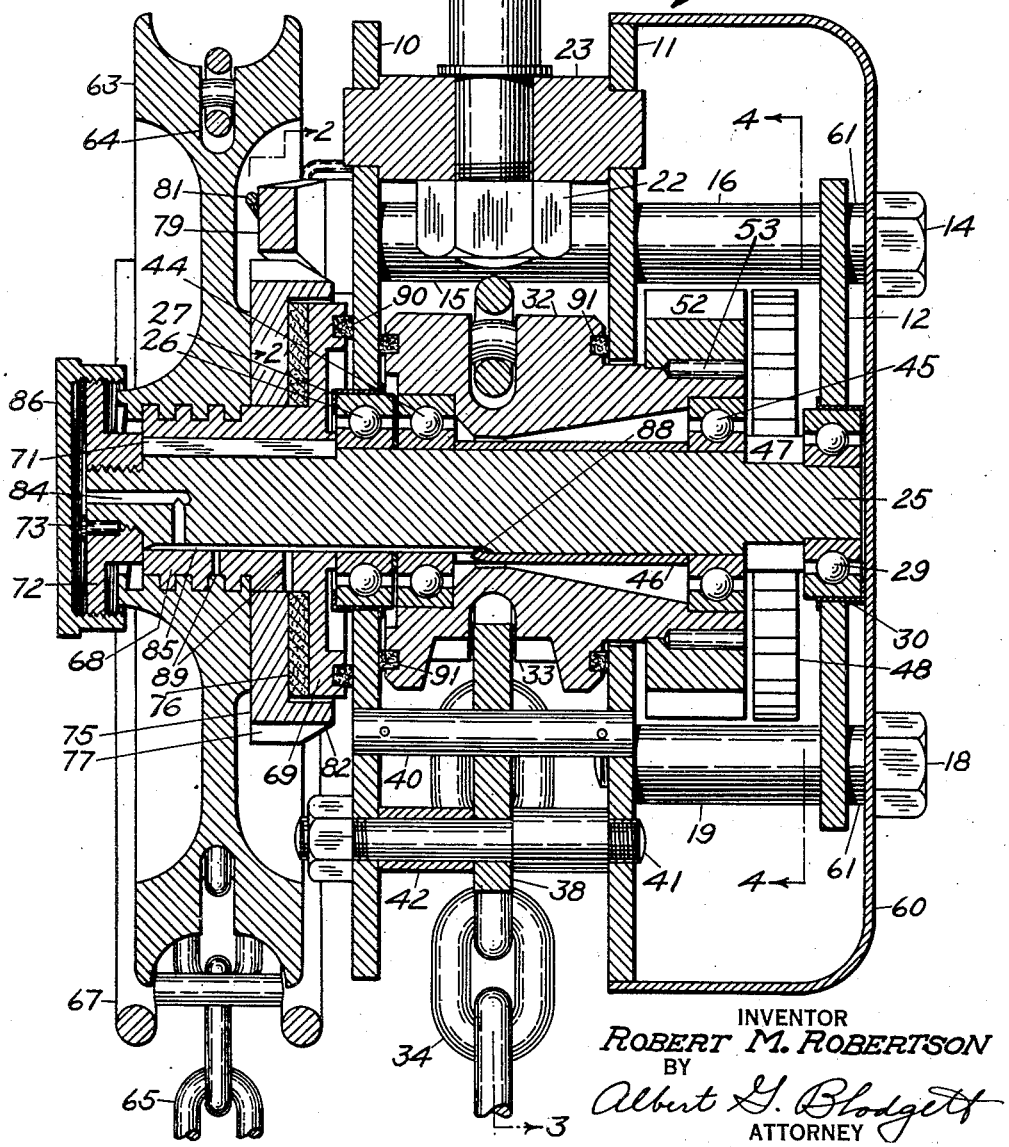
INVENTOR
ROBERT M. ROBERTSON
BY
Albert G. Blodgett
ATTORNEY

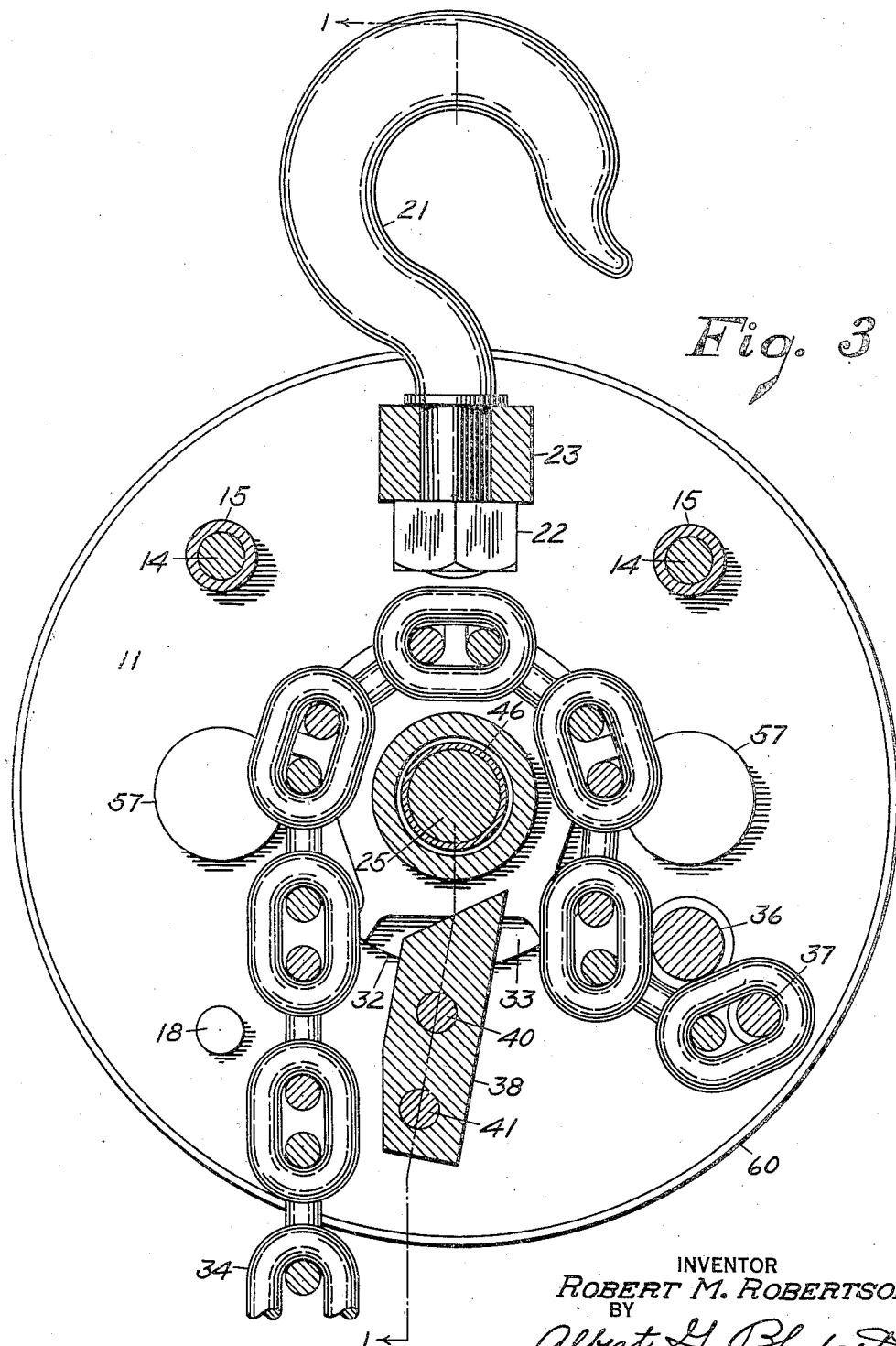

March 6, 1934.    R. M. ROBERTSON    1,949,920
HOIST
Filed March 26, 1931    3 Sheets-Sheet 3

INVENTOR
ROBERT M. ROBERTSON
BY
Albert G. Blodgett
ATTORNEY

Patented Mar. 6, 1934

1,949,920

UNITED STATES PATENT OFFICE 1,949,920

HOIST

Robert M. Robertson, Toronto, Ontario, Canada, assignor to Riley Engineering & Supply Co. Ltd., Toronto, Ontario, Canada, a corporation of Canada Application March 26, 1931, Serial No. 525,478

7 Claims. (Cl. 254—171)

This invention relates to hoists, and more particularly to hoists of the type utilizing a rotatable drive shaft extending through a hollow load wheel carrying the chain or cable, the drive shaft being connected to rotate the load wheel, usually by means of a train of gears.

It has already been recognized that the efficiency and durability of such hoists could be improved by mounting the various rotatable parts on bearings of the rolling type, such as ball or roller bearings. However, all prior constructions of which I am aware have been so arranged that the races of the load wheel bearings must necessarily be of larger diameter. Such large diameter bearings not only add to the bulk of the whole mechanism but they are also very expensive and for some purposes their cost is prohibitive. In an effort to reduce the bearing sizes, many hoists have been made with small diameter drive shafts, and these shafts have frequently broken when the hoist has been dropped upon the floor.

It is accordingly one object of the present invention to provide a hoist which is so arranged that all rotatable parts are mounted on bearings of small diameter and particularly to provide a hoist in which the load wheel is mounted on rolling bearings having races of comparatively small diameter and the drive shaft is nevertheless of sufficient size to avoid any danger of accidental breakage thereof.

It is a further object of the invention to provide a hoist in which undesirable friction losses are reduced to a minimum, and which is provided with bearings and associated parts so arranged that the various loads are transmitted without causing distortion or binding.

It is a further object of the invention to provide a hoist which will be comparatively light and compact, and yet have ample capacity to handle the loads for which it is designed.

It is a further object to provide a hoist which will be simple and inexpensive to manufacture, and which will operate efficiently and without repairs throughout a long life of usefulness.

It is a further object to provide a hoist having a simple and effective means for lubricating the various parts, and which is so arranged that the lubricant will be retained in contact with the bearings and all dirt and grit will be excluded.

With these and other objects in view as will be apparent to those skilled in the art, my invention resides in the combination of parts set forth in the specification and covered by the claims appended hereto.

In accordance with my invention I provide a hoist having a supporting frame in which a drive shaft is rotatably mounted. A hollow load wheel surrounds the drive shaft and is rotatably mounted thereon. In the preferred form, the drive shaft and the load wheel are mounted on rolling bearings which are so arranged that the forces due to the load may be transmitted to the frame without imparting substantial bending moments to the shaft. The drive shaft is connected to rotate the load wheel through a suitable speed changing mechanism such as a spur gear train. The drive shaft may be suitably operated, such as by a handwheel having an endless hand chain thereon, as is usual in this art, and the load wheel may be connected by means of a load chain to the weight which is to be raised. The bearings of the drive shaft and load wheel may be lubricated by grease which is forced along a duct in the drive shaft by a grease cup or other pressure producing means.

Referring to the drawings illustrating one embodiment of the invention and in which like reference numerals indicate like parts:

Fig. 1 is a section through a hand operated chain hoist of the spur gear type, the section being taken on the line 1—1 of Fig. 3;

Fig. 2 is a fragmentary view of a portion of the ratchet and its cooperating pawl, taken on the line 2—2 of Fig. 1;

Fig. 3 is a section on the line 3—3 of Fig. 1;

Figure 4:
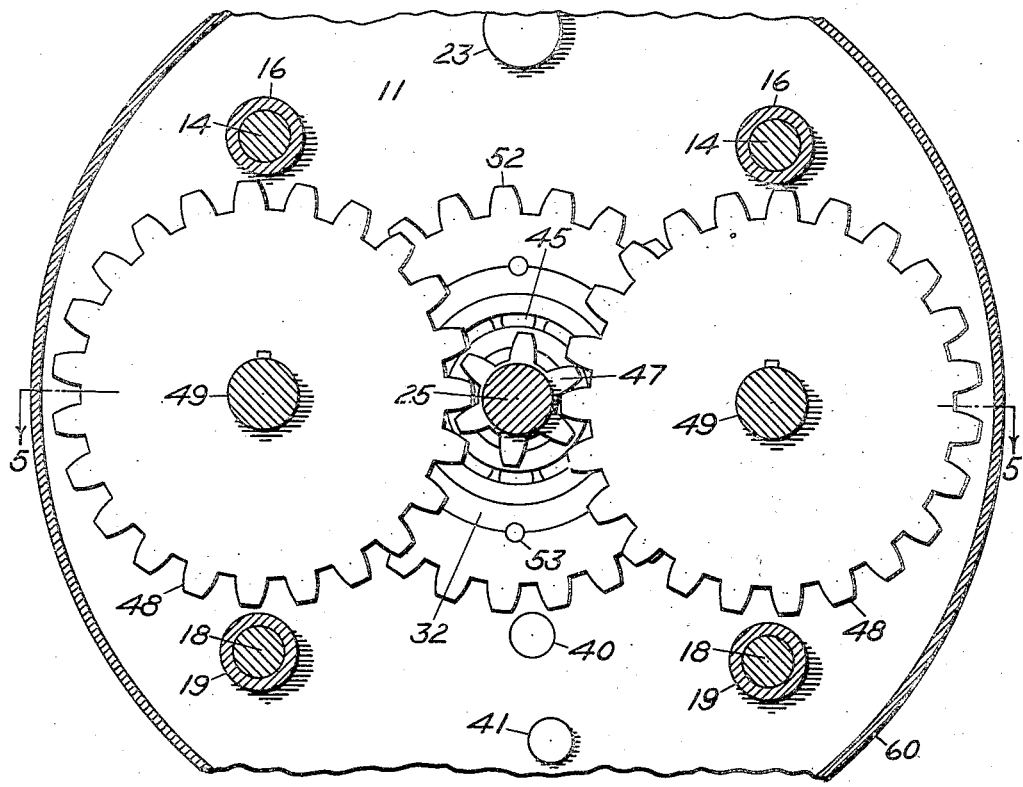
Fig. 4 is a section on the line 4—4 of Fig. 1.

The embodiment illustrated in the drawings comprises three flat plates 10, 11 and 12 which are rigidly connected to form a supporting frame, and which are preferably made of steel, in order to obtain the necessary strength and resistance to shock with a minimum of size and weight. These plates are arranged in spaced parallel vertical planes. Two long bolts 14 extend through all three of the plates at the upper portions thereof, and between the plates these bolts are surrounded by sleeves or collars 15 and 16 which serve as distance pieces to maintain the desired spacing. The plates 11 and 12 are connected at their lower portions by two screws 18 which are surrounded between the plates by spacing sleeves 19. The entire supporting frame of the hoist is arranged to be suspended from any suitable overhead structure by means of a strong steel hook 21 which is fastened by a nut 22 to a horizontal cross head 23 having cylindrical ends mounted in openings in the plates 11 and 12.

A horizontal drive shaft 25 extends through the frame and is rotatably mounted therein. For this purpose I utilize bearings of the rolling type, thereby largely eliminating friction and wear. In the drawings, I have shown a ball bearing 26 having its outer race mounted in a flanged ferrule 27 supported in an opening in the first plate 10. The inner race of the bearing is a snug fit on the drive shaft. An additional ball bearing 29 is provided with its outer race mounted in a flanged ferrule 30 supported in an opening in the third plate 12. The inner race of the bearing 29 is likewise a snug fit on the drive shaft. These bearings 26 and 29 are spaced a considerable distance apart so that the drive shaft is firmly supported in the frame. The ferrules 27 and 30 are Z-shaped in cross-section and so arranged that they receive any end thrust which may be transmitted to the drive shaft. While the ball bearings are designed primarily for radial loads, they have grooves of sufficient depth to withstand any thrust load which may arise incidentally during operation of the hoist.

A hollow load wheel 32 surrounds the drive shaft 25 between the bearings 26 and 29, and this wheel is provided with a pocketed circumferential groove 33 shaped to fit the links of a heavy load chain 34. The groove 33 is preferably directly beneath the supporting hook 21. One end of the load chain is fastened to the frame plates 10 and 11 by means of anchor pins 36 and 37 (Fig. 3), and the other end is arranged to be connected to the load, usually by means of a hook (not shown). As the load wheel is rotated in a clockwise direction in Fig. 3 to raise the load, the extra length of chain will loop downwardly. A chisel shaped stripper 38 extends into the chain groove 33 beneath the load wheel and prevents the chain links from sticking in the groove and kinking the chain. This stripper 38 is mounted on a pin 40 and a stud 41 extending between the frame plates 10 and 11. Spacing sleeves 42 on the stud position the stripper laterally and render the whole frame more rigid.

The load wheel 32 is rotatably mounted on the drive shaft by means of rolling bearings. For this purpose I have shown a pair of ball bearings 44 and 45, each with its outer race mounted inside the load wheel and its inner race snugly fitting the drive shaft. The inner races of these bearings are separated by a spacing sleeve 46 on the shaft. Bearing 44 is mounted closely adjacent to bearing 26, and bearing 45 is near bearing 29, so that the load wheel bearings transmit load to the drive shaft bearings without imparting a substantial bending moment to the drive shaft. As a result the drive shaft need not be made large in diameter. Since both the load wheel bearings 44 and 45 are mounted directly on the drive shaft, their diameter is determined by the size of this shaft rather than by the size of a large load wheel hub as in certain prior art constructions. This is a very important feature of the present invention, and results in greatly reducing not only the cost of manufacture but also the size and weight of the mechanism. The chain groove 33 is located near bearing 44 in a direction longitudinal of the drive shaft, and as a result the major part of the force due to the weight of the load being lifted is transmitted to bearing 44 and thence to the drive shaft without imparting a substantial bending moment to the load wheel. The load wheel can therefore be made comparatively small and light without sacrifice of strength.

In order to transmit power from the drive shaft 25 to the load wheel 32, I provide a spur pinion 47 on the drive shaft. The teeth of this pinion are preferably integral with the shaft and located between the bearings 45 and 29, which are spaced apart a distance equal to the width of the teeth. The pinion 47 meshes with a pair of spur gears 48, one of which is mounted at each side of the pinion and arranged to rotate about an axis parallel to the drive shaft axis and preferably in the same horizontal plane. Each gear 48 is keyed to a shaft 49 having a pinion 51 thereon which is preferably integral with the shaft. The gears 48 and pinions 51 thus form a pair of cluster or compound gears. The pinions 51 both mesh with a gear 52 mounted on the load wheel 32. While gear 52 might be made integral with the load wheel, it is preferably made separate for convenience in assembling the parts and it is fastened to the wheel by means of pins 53. Since the bearing 45 is located within the gear 52, it will support the load wheel directly against any radial load imparted to the gear. Likewise the bearing 29 will receive directly any radial load imparted to pinion 47.

Figure 5:
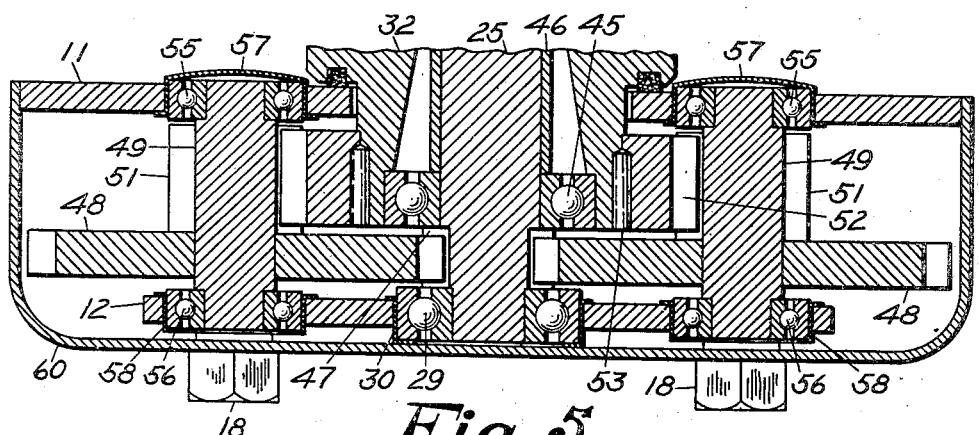
Fig. 5 is a section through the spur gear mechanism, taken on the line 5—5 of Fig. 4.

The shafts 49 which carry the compound gears are rotatably supported in the hoist frame, and for this purpose I preferably provide a ball bearing 55 for the inner end of each shaft and a ball bearing 56 for the outer end of each shaft (Fig. 5). Each bearing 55 has its inner race mounted on the shaft and its outer race mounted in a flanged cup 57 supported in an opening in the second frame plate 11. Each bearing 56 has its inner race mounted on the shaft and its outer race mounted in a flanged ferrule 58 supported in an opening in the third frame plate 12. The flanges on the cups 57 and ferrules 58 prevent endwise movement of the bearings, and the bearings are of a type to withstand any slight end thrust encountered during operation.

The entire spur gear mechanism is preferably enclosed by a cup-shaped circular cover 60 of thin sheet metal which fits tightly on the outer periphery of the second frame plate 11. This cover is held in position by the bolts 14 and the screws 18. Spacing collars 61 (Fig. 1) are placed over these fastening members between the cover 60 and the third frame plate 12.

In the embodiment illustrated, I have shown the hoist arranged for manual operation by means of a hand wheel 63 provided with a peripheral chain groove 64. An endless hand chain 65 is mounted in the groove 64, and a stationary chain guard 67 supported from the hoist frame prevents fouling of the chain. The hand wheel 63 is screw threaded to the outer portion of a hub 68 having an integral flange 69 at its inner end. This flanged hub is fastened to the drive shaft 25 by means of a key 71, the flange 69 being located close to the bearing 26 and just outside of the frame plate 10. A flanged member 72 is threaded to the outer end of the drive shaft, which is preferably reduced in diameter to form a shoulder, and a pin 73 prevents accidental separation of these parts. The member 72 projects outside the hand wheel hub and prevents the hand wheel from being unscrewed from the hub 68, while allowing a slight relative motion.

A flat annular ratchet plate 75 is mounted on the hub 68 between the hand wheel 63 and the flange 69, and this plate is separated from the flange by an annular friction plate 76 of fiber, leather, or other suitable material. The ratchet plate is provided with ratchet teeth 77 on its outer periphery which cooperate with a pawl 79 to prevent reverse rotation of the plate. The pawl 79 is pivoted to the frame plate 10 by means of a screw 80 (Fig. 2), and urged into engagement with the teeth 77 by a spring 81. The ratchet plate 75 is preferably formed with an integral laterally projecting flange 82 which surrounds the friction plate 76 and protects the friction surfaces from external dirt and grit.

In order to provide a simple and effective means for lubricating the various parts of the hoist, I form the drive shaft with a longitudinally extending duct through which grease may be forced under pressure. Such a duct may be conveniently provided by a drilled passage 84 at the end of the drive shaft which leads to a groove 85 extending along the outer surface of the shaft. A grease cup 86 screw threaded to the flanged member 72 provides a suitable means for supplying grease to the duct. The groove 85 extends as far as the sleeve 46, which is notched to avoid obstructing the groove and provided with an ear 88 bent inwardly into the groove to prevent turning of the sleeve relative to the shaft. Passages 89 lead from the groove 85 to the screw threads on hub 68 and to the friction plate 76. Grease is forced along the groove 85 to the bearings 44 and 26, and also passes through the space between sleeve 46 and load wheel 32 to lubricate bearings 45, pinion 47, and bearing 29. Any excess grease forced into the hoist serves to replenish the supply in the gear casing 60, which is packed with a liberal quantity at assembly.

For the purpose of retaining the grease and preventing entry of dirt or grit, I preferably provide a ring 90 of felt or other suitable material which fits in an annular groove in the inner face of flange 69 and contacts with the outer surface of plate 10. A similar felt ring 91 is provided at each side face of the load wheel 32 to contact with the adjacent surfaces of plates 10 and 11.

The operation of the invention will now be apparent to those skilled in the art. The load chain 34 is attached to the load which is to be raised, and hand wheel 63 is rotated by means of hand chain 65. This advances the hand wheel along the screw threads on hub 68 and clamps the ratchet disc 75 tightly between the hand wheel and the friction plate 76. These parts then rotate as a unit with the drive shaft, and the ratchet teeth 77 click idly under the pawl 79. Pinion 47 on the drive shaft rotates gears 48 and pinions 51, which in turn drive gear 52 and load wheel 32 at a greatly reduced speed. The load wheel raises the load chain 34 and the load attached thereto. When the operator ceases to rotate the hand wheel, the load will remain stationary, reverse movement being prevented by the pawl 79. If it is desired to lower the load, hand wheel 63 is rotated in the reverse direction. This unclamps the ratchet disc 75 and allows the load to lower under the influence of gravity, the ratchet disc being held stationary by the pawl. The load will lower only in accordance with the rate at which the hand wheel is rotated, for whenever the load tends to lower too fast the hub 68 will screw into the hand wheel and clamp the ratchet disc against the friction plate 76, thus retarding the load. The flanged member 72 provides for positive rotation of the drive shaft to lower the load chain when there is no load attached thereto. Under these conditions the hand wheel will unscrew from the hub 68 until it strikes the member 72, whereupon it will positively operate the shaft 25 and lower the load chain.

All the moving parts are mounted upon ball bearings, so that friction and wear are practically eliminated. The bearing races are all of comparatively small diameter, which greatly reduces the cost and the space required. Each bearing is so located that it receives its load directly without imparting undesirable bending moments to the various parts. By utilizing the two compound gears on opposite sides of the drive shaft the load is balanced and the radial load on the drive shaft and load wheel bearings is greatly reduced. The grease cup 86 provides a single accessible and convenient means for lubricating all the moving parts of the hoist. The entire hoist is of great strength relative to its size and weight, and it is simple and inexpensive to manufacture.

Having thus described my invention, what I claim as new and desire to secure by Letters Patent is:

1. A hoist comprising a supporting frame, a rolling bearing mounted in the frame, a horizontal drive shaft rotatably mounted in said bearing, a second rolling bearing mounted on the drive shaft closely adjacent to the first mentioned bearing and arranged to transmit its load thereto without imparting a substantial bending moment to the drive shaft, a hollow load wheel surrounding the drive shaft and rotatably supported on said second bearing, and means to transmit power from the drive shaft to the load wheel.

2. A hoist comprising a supporting frame, a rolling bearing mounted in the frame, a horizontal drive shaft rotatably mounted in said bearing, a second rolling bearing mounted on the drive shaft closely adjacent to the first mentioned bearing, a hollow load wheel surrounding the drive shaft and rotatably supported on said second bearing, said load wheel having a chain groove in its outer periphery which is near said second bearing in a direction longitudinal of the drive shaft, a load chain supported in said groove, and means to transmit power from the drive shaft to the load wheel, the parts being so arranged that the force imparted to the load chain by a load will be transmitted to the frame without imparting a substantial bending moment to either the load wheel or the drive shaft.

3. A hoist comprising a supporting frame, a pair of rolling bearings mounted in the frame and spaced a considerable distance apart, a horizontal drive shaft rotatably mounted in said bearings, a second pair of rolling bearings mounted on the drive shaft between the first mentioned bearings, a hollow load wheel surrounding the drive shaft and rotatably supported on said second pair of bearings, and means to transmit power from the drive shaft to the load wheel, each of said second pair of bearings being located near one of the first pair of bearings and arranged to transmit load thereto without imparting a substantial bending moment to the drive shaft.

4. A hoist comprising a supporting frame, a pair of rolling bearings mounted in the frame and spaced a considerable distance apart, a horizontal drive shaft rotatably mounted in said bearings, a pinion on the drive shaft between the bearings and close to one of the bearings, a second pair of rolling bearings mounted on the drive shaft between the first pair of bearings, one of the second pair of bearings being close to one of the first pair, and the other of the second pair of bearings being located close to the pinion, a hollow load wheel surrounding the drive shaft and rotatably supported on the second pair of bearings, and means to transmit power from the pinion to the load wheel.

5. A hoist comprising a supporting frame, a pair of rolling bearings mounted in the frame and spaced a considerable distance apart, a horizontal drive shaft rotatably mounted in said bearings, a second pair of rolling bearings mounted on the drive shaft between the first pair of bearings, a hollow load wheel surrounding the drive shaft and rotatably supported on the second pair of bearings, a spur pinion on the drive shaft between one of the first mentioned bearings and the adjacent bearing of the second pair, a spur gear on the load wheel, and a compound gear connecting the drive shaft pinion with the load wheel gear.

6. A hoist comprising three plates arranged in spaced vertical planes and connected to form a rigid supporting frame, a rolling bearing mounted in the first plate, a rolling bearing mounted in the third plate, a horizontal drive shaft rotatably mounted in said bearings, a pinion on the drive shaft between the bearings and closely adjacent to the bearing in the third plate, a second pair of rolling bearings mounted on the drive shaft between the bearing in the first plate and the pinion, a hollow load wheel surrounding the shaft and rotatably supported on the second pair of bearings, and speed reducing mechanism located between the second and third plates and arranged to transmit power from the pinion to the load wheel.

7. A hoist comprising three flat plates arranged in spaced vertical planes, means connecting the plates to form a rigid supporting frame, a rolling bearing mounted in the first plate, a rolling bearing mounted in the third plate, a horizontal drive shaft rotatably mounted in said bearings, a spur pinion on the drive shaft between the bearings and closely adjacent to the bearing in the third plate, a second pair of rolling bearings mounted on the drive shaft between the bearing in the first plate and the pinion, a hollow load wheel surrounding the shaft and rotatably supported on the second pair of bearings, a spur gear on the load wheel between the second and third frame plates, and a compound gear at each side of the drive shaft connecting the drive shaft pinion with the load wheel gear, each of said compound gears being rotatably supported in bearings on the second and third frame plates.

ROBERT M. ROBERTSON.